US006496532B1

(12) United States Patent
Raitola et al.

(10) Patent No.: US 6,496,532 B1
(45) Date of Patent: Dec. 17, 2002

(54) FREQUENCY HOPPING METHOD AND RADIO SYSTEM

(75) Inventors: Mika Raitola, Masala; Marko Silventoinen, Helsinki, both of (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/101,526

(22) PCT Filed: Nov. 12, 1997

(86) PCT No.: PCT/FI97/00688

§ 371 (c)(1),
(2), (4) Date: Sep. 29, 1998

(87) PCT Pub. No.: WO98/21834

PCT Pub. Date: May 22, 1998

(30) Foreign Application Priority Data

Nov. 13, 1996 (FI) .................................................. 964550

(51) Int. Cl.⁷ .............................................. H04K 7/00
(52) U.S. Cl. ...................................... 375/132; 455/434
(58) Field of Search ........................ 375/132, 133–137; 370/335–342; 455/434, 515, 509

(56) References Cited

U.S. PATENT DOCUMENTS

| 4,558,453 A | * | 12/1985 | Mimken ......................... 375/1 |
| 4,850,036 A | * | 7/1989 | Smith |
| 5,263,047 A | * | 11/1993 | Kotzin et al. |
| 5,381,443 A | | 1/1995 | Borth et al. |
| 5,408,495 A | * | 4/1995 | Kotzin et al. |
| 5,442,659 A | * | 8/1995 | Bauchot et al. ............. 375/202 |
| 5,506,863 A | | 4/1996 | Meidan et al. ............... 375/202 |
| 5,537,434 A | * | 7/1996 | Persson et al. ............. 375/202 |
| 5,625,641 A | * | 4/1997 | Takakusaki .................. 375/202 |
| 5,774,808 A | * | 6/1998 | Sarkioja et al. ............. 455/436 |
| 5,839,071 A | * | 11/1998 | Johnson ....................... 455/440 |

FOREIGN PATENT DOCUMENTS

| EP | 0 650 304 | 4/1995 |
| FI | 97838 | 11/1993 |
| WO | WO 93/22849 | 11/1993 |
| WO | WO 95/26040 | 9/1995 |
| WO | WO 96/24200 | 8/1996 |

OTHER PUBLICATIONS

1997 Kronestedt, et al., IEEE 47th Vehicular Technology Conference, "Frequency Planning Strategies for Frequency Hopping GSM", p. 1862–1866.
Copy of the International Search Report for PCT/FO97/00688.

* cited by examiner

Primary Examiner—Jean Corrielus
(74) Attorney, Agent, or Firm—Altera Law Group, LLC (57) ABSTRACT

The invention relates to a frequency hopping method and a radio system. Frequency hopping is implemented downlink to the frequency of the broadcast control channel. The radio system comprises a network part (100), a subscriber terminal (102) and a radio connection (104) as the transmission path. The novelty is that the broadcast control channel does not usually perform frequency hopping. The simplest implementation of the system is a software modification in the network part (100) and the subscriber terminal (102). The invention can be applied to all radio systems using frequency hopping, particularly to the GSM/DCS 1800 systems and the UMTS system.

19 Claims, 6 Drawing Sheets

| Multiframe Number | f1 | f2 | f3 | f4 | f5 | f6 |
|---|---|---|---|---|---|---|
| ... | | | | | | |
| 3 | | BCCH | | | | |
| 2 | SCH | | | | | |
| 1 | SCH | | | | | |
| 0 | FCCH | | | | | |
| 50 | | | | | | |
| 49 | | | | | | CCCH |
| 48 | | | | | CCCH | |
| ... | | | | | | |
| 25 | | | | | | BCCH |
| 24 | | | | | BCCH | |
| 23 | | | | BCCH | | |
| 22 | | | SCH | | | |
| 21 | | | SCH | | | |
| 20 | | | FCCH | | | |
| 19 | | | CCCH | | | |
| 18 | | CCCH | | | | |
| 17 | CCCH | | | | | |
| 16 | | | | | | BCCH |
| 15 | | | | | BCCH | |
| 14 | | | | BCCH | | |
| 13 | | | BCCH | | | |
| 12 | | SCH | | | | |
| 11 | | SCH | | | | |
| 10 | | FCCH | | | | |
| 9 | | CCCH | | | | |
| 8 | CCCH | | | | | |
| 7 | | | | | | CCCH |
| 6 | | | | | BCCH | |
| 5 | | | | BCCH | | |
| 4 | | | BCCH | | | |
| 3 | | BCCH | | | | |
| 2 | SCH | | | | | |
| 1 | SCH | | | | | |
| 0 | FCCH | | | | | |

| Multiframe Number | f1 | f2 | f3 | f4 | f5 | f6 |
|---|---|---|---|---|---|---|
| . | . | . | . | . | . | . |
| 3 | | BCCH | | | | |
| 2 | | BCCH | | | | |
| 1 | SCH | | | | | |
| 0 | FCCH | | | | | |
| 50 | | | | | | |
| 49 | | CCCH | | | | |
| 48 | | | | | | CCCH |
| . | . | . | . | . | . | . |
| 25 | BCCH | | | | | |
| 24 | | | | | | BCCH |
| 23 | | | | | BCCH | |
| 22 | | | BCCH | | | |
| 21 | | | SCH | | | |
| 20 | | FCCH | | | | |
| 19 | | | CCCH | | | |
| 18 | | | CCCH | | | |
| 17 | | CCCH | | | | |
| 16 | CCCH | | | | | |
| 15 | | | | | | BCCH |
| 14 | | | | | BCCH | |
| 13 | | | CCCH* | | | |
| 12 | | | BCCH | | | |
| 11 | | SCH | | | | |
| 10 | | FCCH | | | | |
| 9 | | | CCCH | | | |
| 8 | | CCCH | | | | |
| 7 | CCCH | | | | | |
| 6 | | | | | | CCCH |
| 5 | | | | BCCH | | |
| 4 | | | BCCH | | | |
| 3 | | | BCCH | | | |
| 2 | | BCCH | | | | |
| 1 | SCH | | | | | |
| 0 | FCCH | | | | | |

| | | | | | | |
|---|---|---|---|---|---|---|
| 3 | BCCH | | | | | |
| 2 | SCH | | | | | |
| 1 | SCH | | | | | |
| 0 | FCCH | | | | | |
| 50 | | | | | | |
| 49 | | | | | | CCCH |
| 48 | | | | | CCCH | |
| . | | | | | | |
| 25 | | | | | | BCCH |
| 24 | | | | | BCCH | |
| 23 | | | | BCCH | | |
| 22 | | | SCH | | | |
| 21 | | | SCH | | | |
| 20 | FCCH | | | | | |
| 19 | | | CCCH | | | |
| 18 | | CCCH | | | | |
| 17 | CCCH | | | | | |
| 16 | | | | | | BCCH |
| 15 | | | | | BCCH | |
| 14 | | | | BCCH | | |
| 13 | | | BCCH | | | |
| 12 | | SCH | | | | |
| 11 | | SCH | | | | |
| 10 | FCCH | | | | | |
| 9 | | CCCH | | | | |
| 8 | CCCH | | | | | |
| 7 | | | | | | CCCH |
| 6 | | | | | BCCH | |
| 5 | | | | BCCH | | |
| 4 | | | BCCH | | | |
| 3 | | | BCCH | | | |
| 2 | SCH | | | | | |
| 1 | SCH | | | | | |
| 0 | FCCH | | | | | |
| Multiframe Number | f1 | f2 | f3 | f4 | f5 | f6 |
| | Frequency | | | | | |

FREQUENCY HOPPING METHOD AND RADIO SYSTEM

This is a 371 of PCF/FI97/00688, filed Nov. 12, 1997.

FIELD OF THE INVENTION

The invention relates to a method of implementing downlink frequency hopping to the frequency of a broadcast control channel in a radio system comprising a network part, a subscriber terminal and a radio connection as the transmission path between the network part and the subscriber terminal.

BACKGROUND ART

Frequency hopping was developed for military radio systems to complicate eavesdropping and to eliminate interference. In eliminating interference it should be noted that frequency diversity and interferer diversity are achieved by frequency hopping. Frequency hopping is implemented by a transmitter transmitting a given amount of radio information at a given frequency. The transmitter then continues to transmit radio information at another frequency. The frequency can be changed several times. Usually the frequency is changed as a known series, and this is called a frequency hopping sequence.

In radio systems, each base station has one carrier, called a broadcast channel. The term control channel may also be used. In fact, the term refers to several channels used by a subscriber terminal and the network part for controlling their operations. Downlink broadcast channels are called broadcast control channels. In addition to these, the same carrier is used to transmit the actual traffic channels, on which user payload, such as speech or data, are transferred after a connection has been established. When needed, signalling data may also be transported within traffic channels.

The term channel is used in two different meanings. In this representation, a channel refers to a logical channel containing data characteristic of it. The second meaning of a channel refers to a physical channel used for carrying the logical channel. In this representation, a physical channel is called a time slot.

In the GSM system, one physical channel is one time slot of a TDMA frame. Logical channels are common channels or dedicated channels. A TDMA frame comprises 8 time slots. A 26-multiframe of the length of 26 TDMA frames has been defined for dedicated channels. Similarly, a 51-multiframe of the length of 51 TDMA frames has been defined for common channels.

The common channels comprise BCH channels (Broadcast Channel) and CCCH channels (Common Control Channel). The BCH channels comprise a FCCH channel (Frequency Correction Channel), a SCH channel (Synchronization Channel) and BCCH channels (Broadcast Control Channel). The CCCH channels comprise a PCH channel (Paging Channel), an AGCH channel (Access Grant Channel) and RACH channels (Random Access Channel). The dedicated channels comprise traffic channels and DCH channels (Dedicated Control Channel). The DCH channels comprise an SDCCH channel (Stand-alone Dedicated Control Channel), an SACCH channel (Slow Associated Control Channel) and an FACCH channel (Fast Associated Control Channel).

As to the present invention, the essential channels are the broadcast control channels, including the FCCH channel, SCH channel, BCCH channels and CCCH channels (the PCH and AGCH channels). The FCCH channel comprises frequency correction information for a subscriber terminal. The SCH channel comprises frame synchronization information. The BCCH channel comprises general base station-dedicated information. Of the CCCH channels, the PCH channel comprises call information and the AGCH channel information about the allocation of a traffic channel to a subscriber terminal.

The broadcast control channel is transmitted at full transmitter power and at the same frequency, i.e. frequency hopping cannot be utilized. This causes problems to planning and using a radio system.

The major problem is double network planning. At first, the use of normal carriers is planned. It can be enhanced by frequency hopping, discontinuous transmission and power control. Secondly, the use of the carriers of the broadcast control channels is planned.

Another major problem is that the capacity of the system reduces as the traffic channels that are on the same carrier as the broadcast control channel cannot utilize frequency hopping, discontinuous transmission and power control.

SUMMARY OF THE INVENTION

It is the object of the present invention to implement frequency hopping to the frequency of the broadcast control channel, the method avoiding the presented problems.

This is achieved with the method described in the preamble, characterized in that the method comprises the following steps:

A) the network part transmits on the broadcast control channel a first signal group to the subscriber terminal at a given frequency, the first signal group stating at which second frequency the first signal group will be transmitted the next time, B) the network part then transmits on the broadcast control channel a known number of other signals to the subscriber terminal using frequency hopping, and the offset of the first frequency hop has been agreed in advance, and the offsets of the other frequency hops are agreed in advance, C) step A is entered, the network part transmitting the following first signal group to the subscriber terminal at a second frequency, D) steps A to C are repeated, the frequency hopping sequence being formed of a given number of steps A to C.

The invention also relates to a system for implementing downlink frequency hopping to the frequency of a broadcast control channel in a radio system comprising a network part, a subscriber terminal and a radio connection as the transmission path between the network part and the subscriber terminal.

The system is characterized in that the network part is adapted to transmit on the broadcast control channel a first signal group to the subscriber terminal at a given frequency, the first signal group stating at which second frequency the first signal group will be transmitted the next time, and to transmit on the broadcast control channel other signals to the subscriber terminal using frequency hopping, the offset of the first frequency hop being agreed in advance, and the offsets of the other frequency hops being agreed in advance; the subscriber terminal is adapted to generate a frequency hopping sequence of the transmission frequencies of the first signal group, the offset of the first frequency hop and the offsets of the other frequency hops.

The method of the invention provides a plurality of advantages. The performance of all channels on the carrier of the broadcast control channel improves significantly as frequency hopping can be used.

A significant advantage is gained by network planning becoming much easier. Double network planning is no longer needed, as all the channels transmitted by the network part are able to utilize frequency hopping. It is even possible that cell frequency planning does not have to be carried out at all: the base station randomly selecting a frequency hopping sequence. Should some neighbouring base stations use the same frequencies, frequency hopping ensures that the performance remains sufficiently good.

The system of the invention has the same advantages as described above in connection with the method. The preferred embodiments of the invention and the other more detailed embodiments emphasize the advantages of the invention. It is obvious that the preferred embodiments and the more detailed embodiments can be combined to different combinations to achieve the desired technical power.

DESCRIPTION OF THE DRAWINGS

In the following the invention will be described in more detail with reference to examples in accordance with the attached drawings, in which.

DESCRIPTION OF THE PREFERRED EMBODIMENTS

Figure 1:
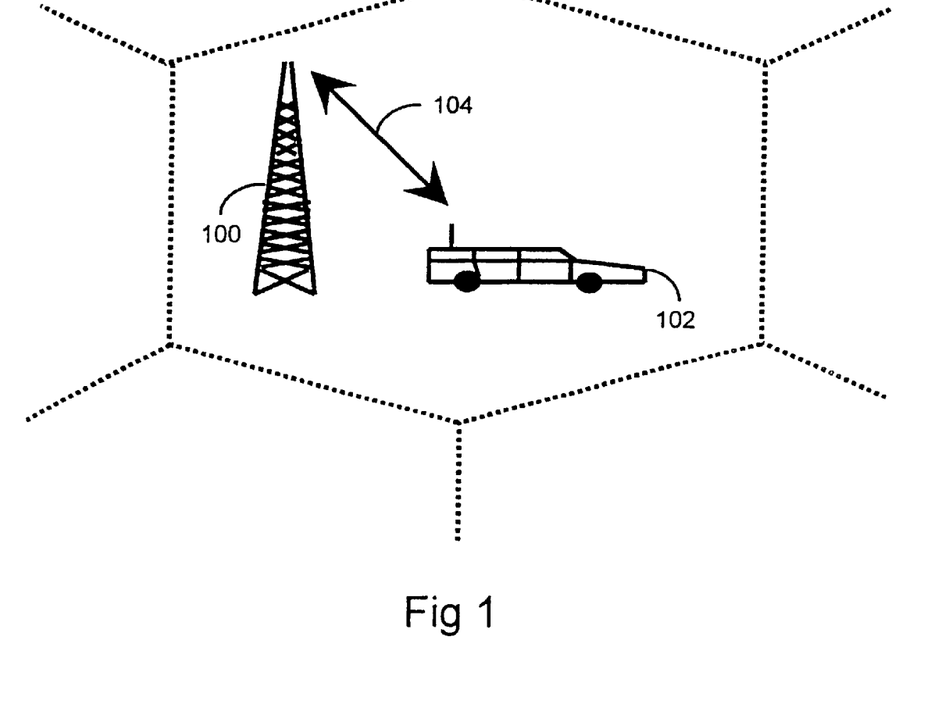
FIG. 1 shows a radio system.

FIG. 1 shows the parts of a radio system essential to the invention. The radio system comprises a network part 100 and a subscriber terminal 102. A radio connection 104 between the network part 100 and the subscriber terminal 102 constitutes the transmission path. In practice a radio system comprises hundreds, even thousands of base stations and numerous subscriber terminals.

Figure 2:
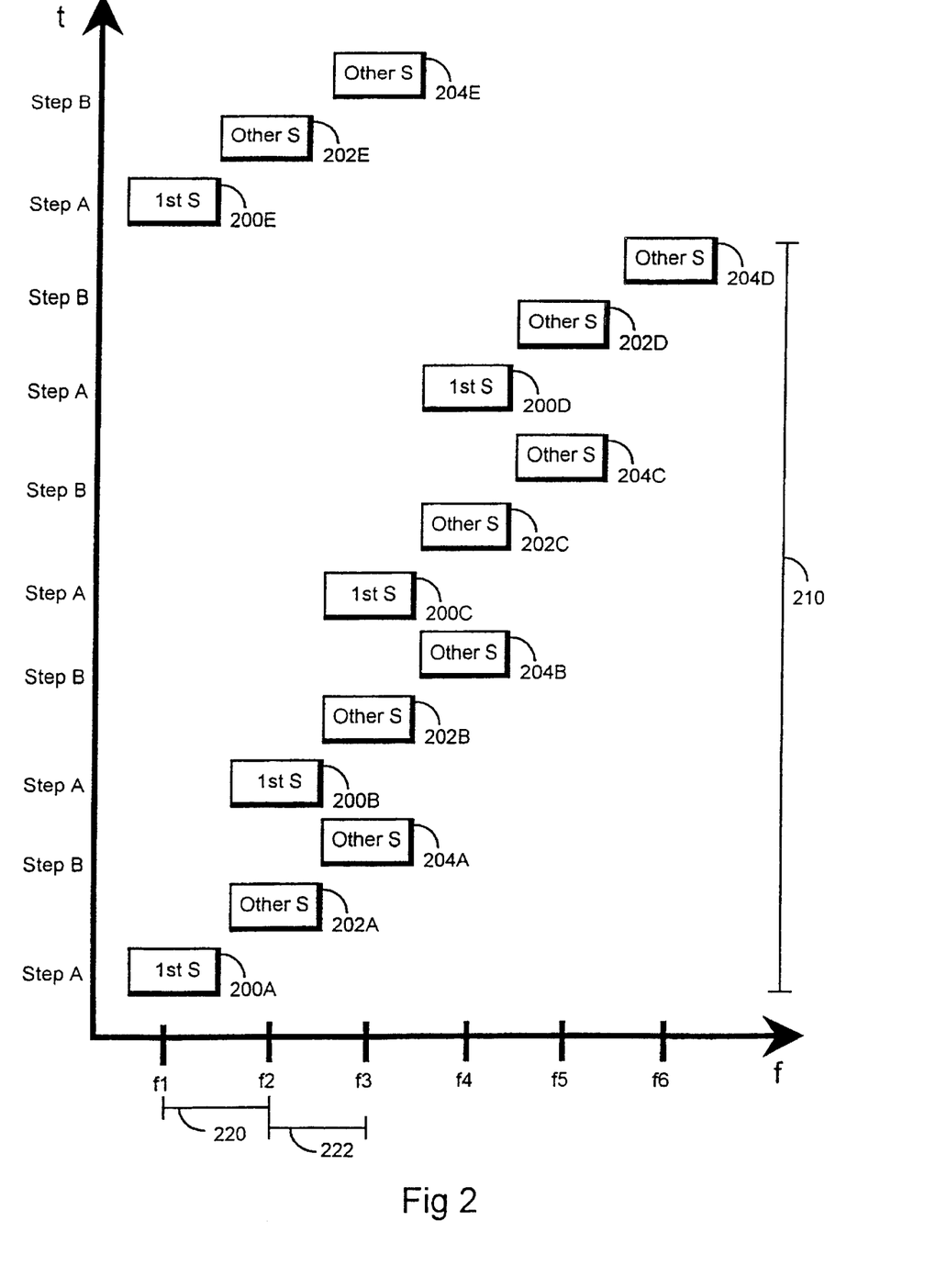
FIG. 2 shows the implementation of frequency hopping in accordance with the invention.

FIG. 2 shows frequencies f1 to f6 on the X axis and time on the Y axis. The frequency hopping method of the invention is implemented as follows:

A) The network part 100 transmits on the broadcast control channel a first signal group 200A to the subscriber terminal 102 at frequency f1. The signal group 200 refers to an entity formed by one or more single signals. The first signal group 200A states at which second frequency the first signal group 200B will be transmitted the next time.

B) The network part 100 then transmits on the broadcast control channel a given number of other signals 202A, 204A to the subscriber terminal 102 using frequency hopping. The number of the other signals 202, 204 may be one or more, in this example the number is two. The first other signal 202A is transmitted at frequency f2 and the second other signal 204A at frequency f3. The offset 220 of the first frequency hop, i.e. the offset of the frequency from frequency f1 to frequency f2 has been agreed in advance, i.e. it is known both to the subscriber terminal and the network part. The offsets 222 of the other frequency hops, i.e. in this example the offset of frequency f2 to frequency f3, have also been agreed in advance.

C) The network part 100 then transmits the next first signal group 200B to the subscriber terminal 102 at a second frequency f2 which was stated in the previous first signal group 200A. The other signals 202B, 204 are then transmitted at frequencies f3 and f4.

D) The steps A to C are repeated, the frequency hopping sequence 210 being formed of a given number of steps A to C. In this example, the frequency hopping sequence 210 is thus f1-f2-f3-f2-f3-f4-f3-f4-f5-4-f5-f6. The frequency hopping sequence 210 is then resumed from the start.

The subscriber terminal 102 learns the frequency hopping sequence by listening to frequencies. When it finds a first signal group 200, it starts to follow the chain by tuning to the frequency given by the first signal group 200. Having followed the chain for some time, the subscriber terminal 102 observes its repetition, and the subscriber terminal 102 has thus learned the frequency hopping sequence.

In a preferred embodiment of the invention, the first signal group 200 also states the offset 220 of the first frequency hop. The advantage gained by this is that the offset does not have to be a default value agreed in advance, but can be adapted to best suit the circumstances.

In a second preferred embodiment, the first signal group 200 states at which at least two other frequencies the first signal group 200 will be transmitted at least the next and the following time. Thus the subscriber terminal 102 does not lose the entire frequency hopping sequence 210, even if it fails to hear the next first signal group 200.

Let us next study the implementation of the invention in the GSM system without, however, restricting the invention to this system. It is obvious that the invention can be implemented in various radio systems using frequency hopping, e.g. the enhanced GSM system, the DCS1800 system, and the UMTS system. In the GSM system, the first signal group 200 comprises at least one FCCH signal and at least one SCH signal. The other signals 202, 204 comprise the BCCH signals and/or the CCCH signals. A typical structure of a 51-multiframe is such that time slot 0 comprises the common channels and time slots 1 to 7 the dedicated channels. Regarding the invention, it is essential to study how the common channels in the time slot 0 frequency hop, as prior art solutions can be applied to the dedicated channels in the time slots 1 to 7, the frequency hopping sequence being notified to these channels in the BCCH channel.

Figure 3:
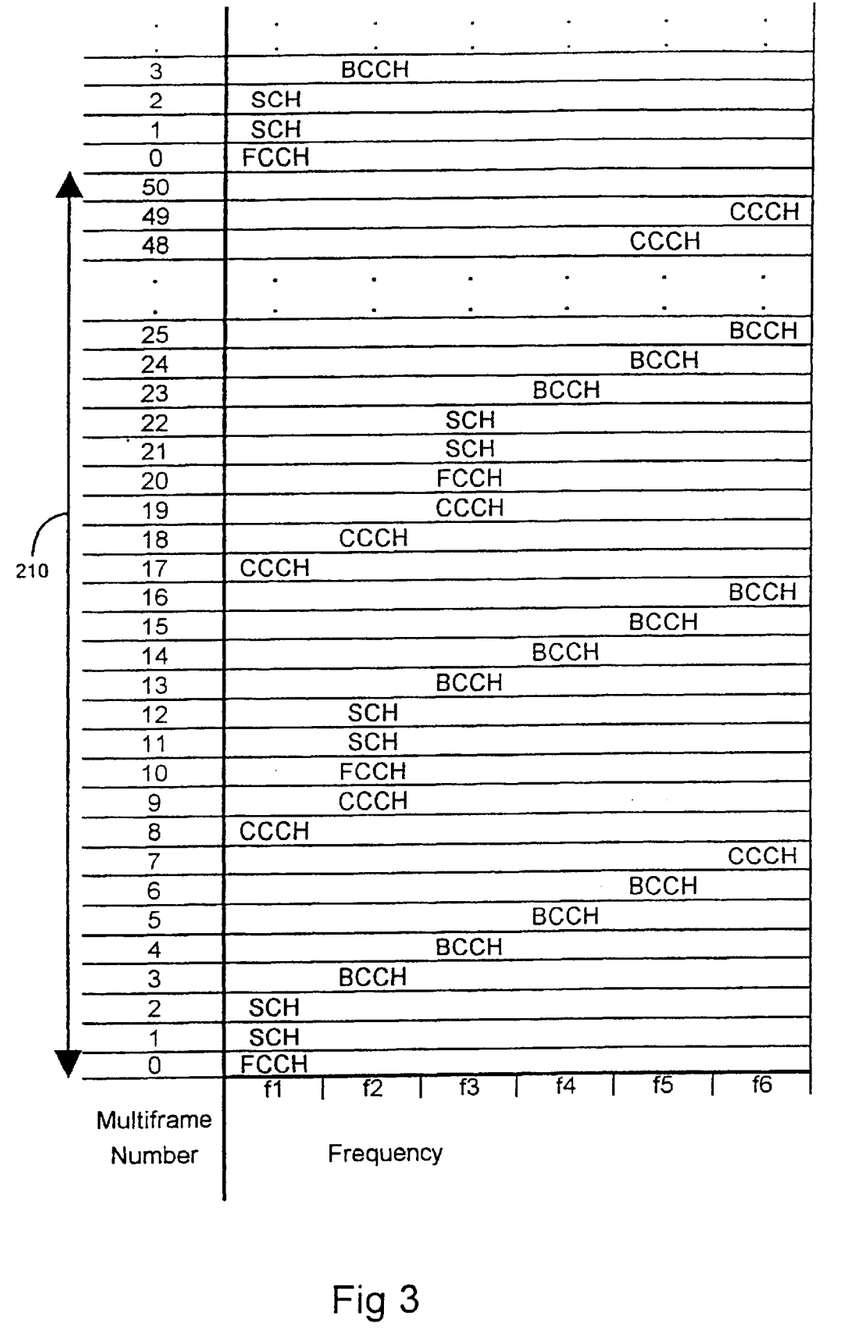
FIG. 3 shows a manner of implementing frequency hopping in the GSM system.

FIG. 3 shows how the method is implemented in the GSM system. The X axis again shows frequencies f1 to f6. The Y axis shows the time, in this case as the number 0 to 50 of the time slot zero of the 51-multiframe as order numbers of zero 0 to 50. The first signal group is first transmitted at frequency f1. The group consists of three signals, including a FCCH channel and two SCH channels. Usually there is only one SCH channel, but in this embodiment of the invention one CCCH channel has been replaced by one SCH channel. Next, four BCCH signals are transmitted, at frequencies f2, f3, f4, and f5. Three CCCH signals are then transmitted at frequencies f6, f1, and f2. The next first signal group is then transmitted at frequency f2, followed by 7 CCCH signals at frequencies f3, f4, f5, f6, f1, f2, and f3. This group of a FCCH signal, two SCH signals and seven CCCH signals is still repeated twice in the frequency hopping sequence 210 of this example. Nothing is transmitted in the time slot zero of the last 51-multiframe. As mentioned above, the second SCH signal states at which second frequency the first signal group, i.e. one FCCH signal and two SCH signals, will be transmitted the next time.

Figure 4:
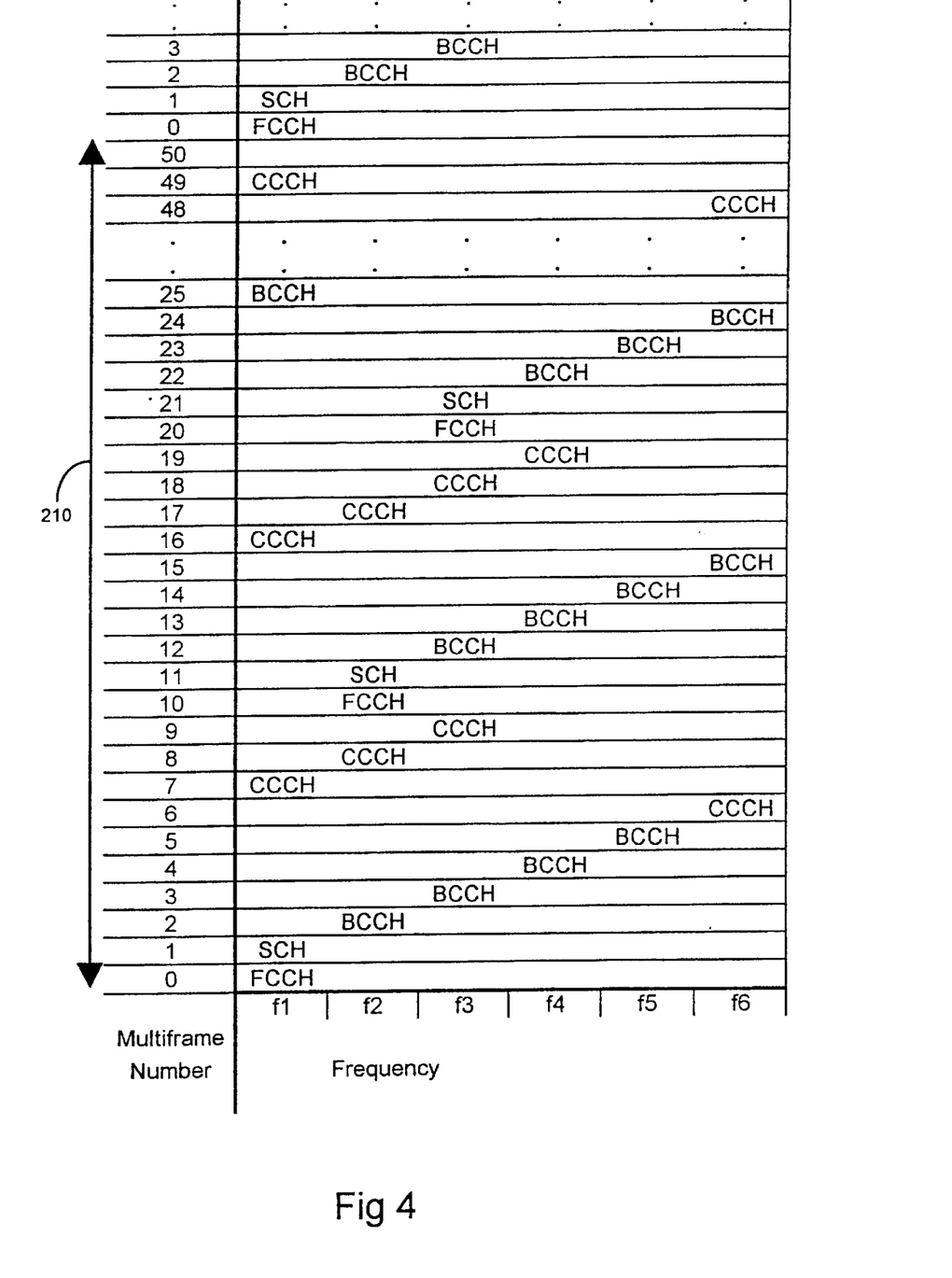
FIG. 4 shows a second manner of implementing frequency hopping in the GSM system.

An embodiment of the invention does not need an extra SCH signal; instead the first SCH signal states at which seconds frequency the first signal group, i.e. one FCCH signal and two SCH signals, will be transmitted the next time. The advantage of this is that the division of existing time slots does not have to be changed. This embodiment of the invention is shown in FIG. 4. The frequency hopping sequence 210 is repeated as shown in FIG. 3, the difference being that there is only one SCH signal, the number of CCCH signals not having to be decreased.

Figure 5:
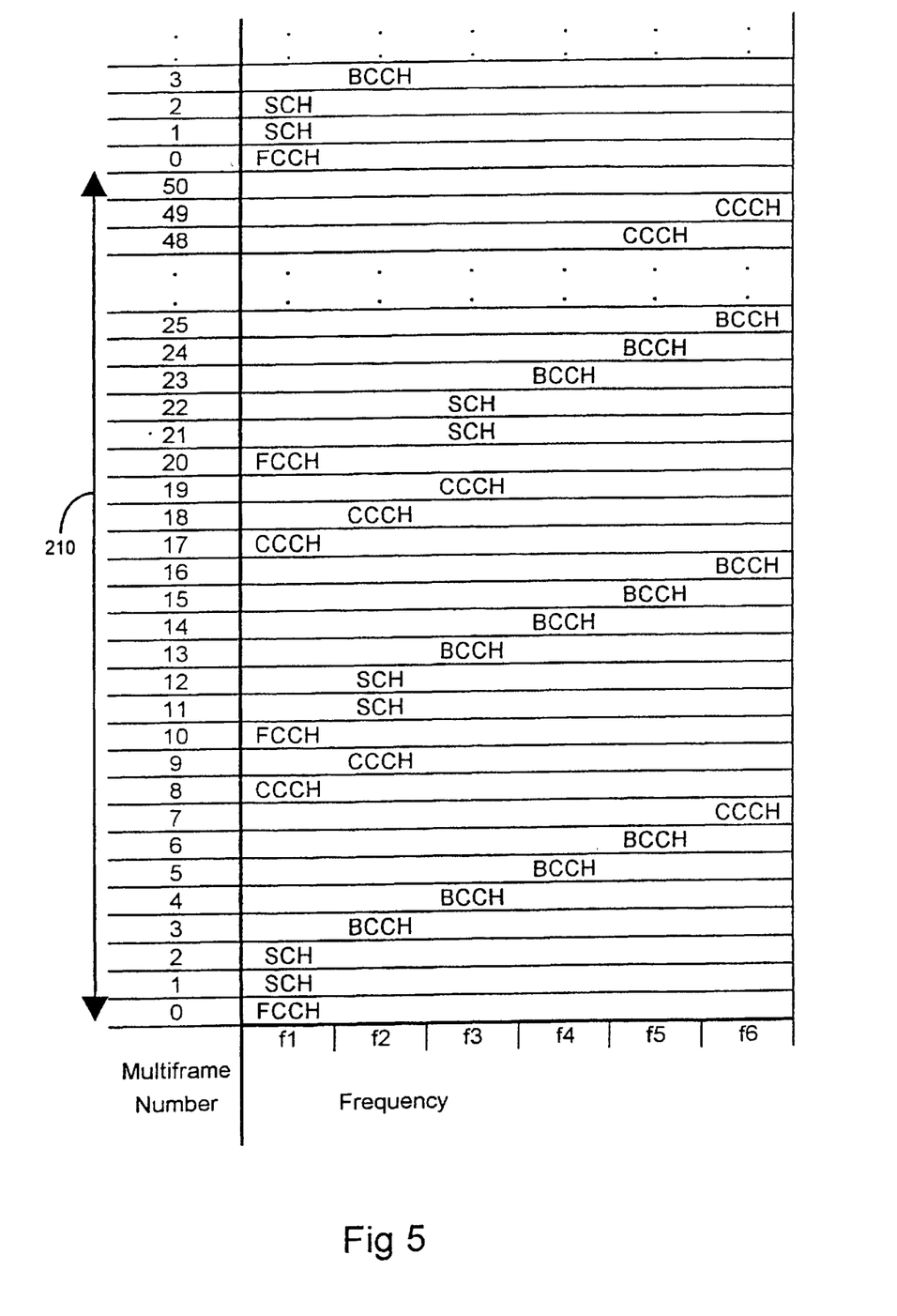
FIG. 5 shows a third manner of implementing frequency hopping in the GSM system.

FIG. 5 shows an embodiment of the invention in which the FCCH signal is always transmitted at a given frequency in order to improve frequency synchronization. The FCCH signal is consequently left outside the frequency hopping. FIG. 5 shows how the FCCH signal is always transmitted at frequency f1. The Figure shows two SCH signals as does FIG. 3, but it is obvious that this embodiment can also be combined with the embodiment of FIG. 4, the number of SCH signals being only one.

The SCH signal comprises the BSIC (Base Station Identity Code) and the TDMA frame number. In accordance with the embodiment shown in FIG. 3, the first SCH signal comprises the TDMA frame number, and the second SCH signal the BSIC and the frequency of the first signal group to be transmitted next. In accordance with the embodiment shown in FIG. 4, the SCH signal comprises the BSIC and the frequency of the first signal group to be transmitted next.

The downlink frequency hopping sequence is also used for common uplink channels, e.g. the RACH channels in the GSM system.

Figure 6:
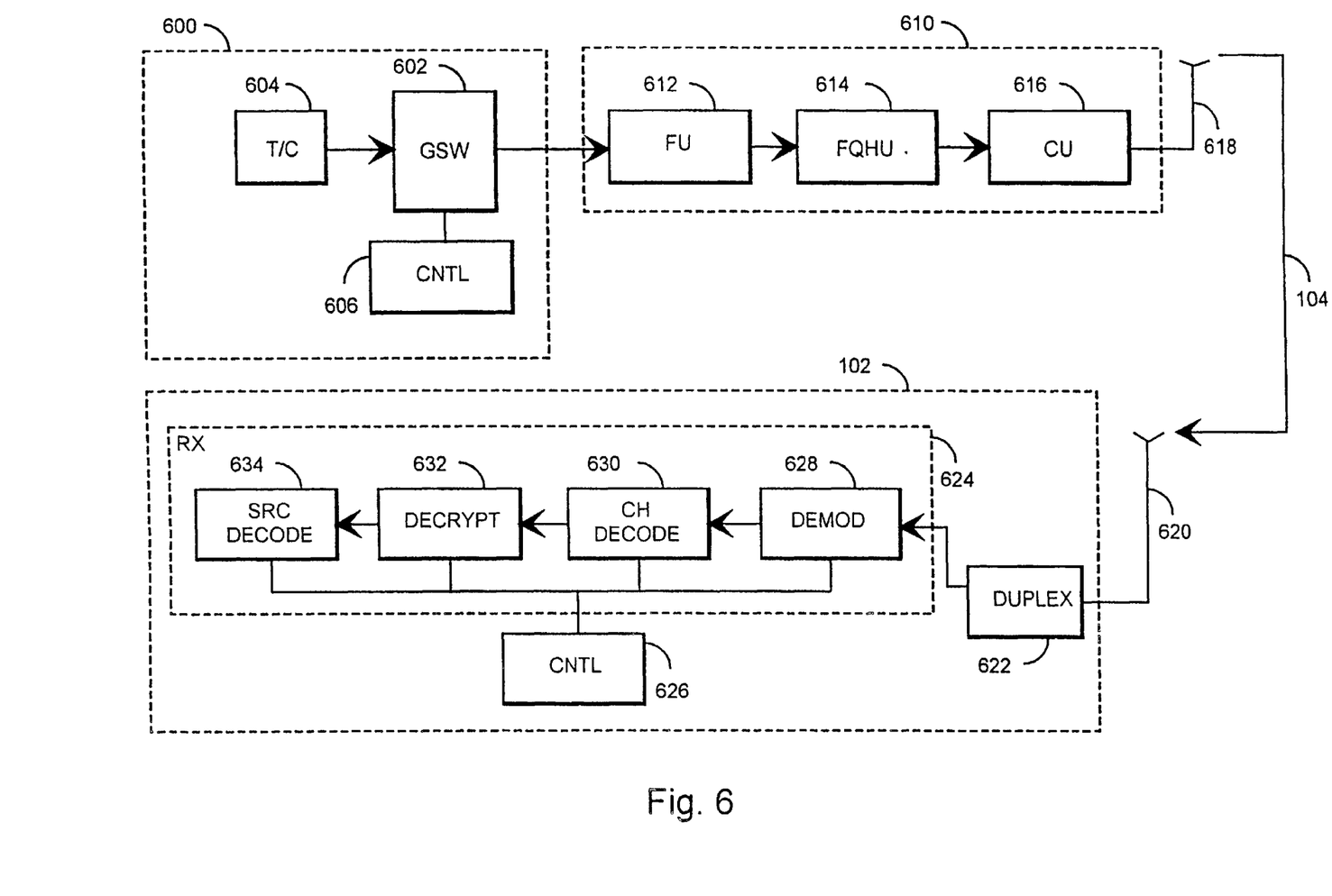
FIG. 6 shows an example of the system.

The invention also relates to a radio system for implementing the method. The network part and the subscriber terminal are adapted to carry out the method of the invention. In accordance with FIG. 1, the essential parts of the system are the network part 100 and the subscriber terminal 102 with a radio connection 104 between them. The network part comprises a base station, a base station controller and a mobile telephone exchange. FIG. 6 shows an example of how the system is adapted to carry out the necessary procedure. The base station controller 600 is in connection with the base station 610. The base station controller 600 comprises a group switching field 602, a transcoder 604 and a control unit 606. The group switching field 602 is used to switch speech and data and to connect signalling circuits. The transcoder 604 converts the different digital speech encoding forms used between a public switched telephone network and a mobile communication network into a form suitable for one another. The control unit 606 carries out call control, mobility management, collecting statistical data, and signalling. The base station 610 comprises a frame unit 612, a frequency hopping unit 614, a carrier unit 616 and an antenna 618. The frame unit 612 is used for channel encoding, channel interleaving, data encryption and burst generation. The frequency hopping unit 614 is used for frequency hopping to the base band carrier. The carrier unit 616 performs modulation and A/D conversion on a signal to be transmitted. The subscriber terminal 102 comprises an antenna 620, a duplex filter 622, a receiver 624 and a control part 626. The receiver 624 comprises a demodulator 628, a channel decoder 630, a decrypter 632 and a source decoder 634.

The way to employ the method is for the base station 610 to transmit on the broadcast control channel a first signal group 200 to the subscriber terminal 102 at a given frequency, the first signal group 200 stating at which second frequency the signal group 200 will be transmitted the next time. The base station additionally transmits on the broadcast control channel other signals 202, 204 to the subscriber terminal 102 using frequency hopping, the offset 220 of the first frequency hop being agreed in advance, and the offsets 222 of the other frequency hops being agreed in advance. The simplest way to implement the invention is to convert the steps of the method of the invention into executable software. The software can then be placed e.g. in the memory of the control part 606 of the base station controller 600. The control part 606 then signals to the base station 610 that the necessary data be placed in the frame unit 612 to the channel to be transmitted. The frequency hopping unit 614 is also signalled how it has to implement the frequency hopping sequence. The means can also be implemented by general of signal processors or by discrete logic.

The subscriber terminal 102 forms the frequency hopping sequence 210 of the transmission frequencies of the first signal group 200, the offset 220 of the first frequency hop, and the offsets 222 of the other frequency hops. The simplest way to implement the invention is for the steps of the method of the invention to be converted into executable software. In this way the software can be stored in the memory of the control part 626 and be executed in the same control part 626, the software receiving the necessary information from the receiver 624. The implementation can also be carried out by general or signal processors or by discrete logic.

Even though the invention has been explained in the above with reference to the example in accordance with the accompanying drawings, it is obvious that the invention is not restricted to it but can be modified in various ways within the scope of the inventive idea disclosed in the attached claims.

What is claimed is:

1. A method of implementing downlink frequency hopping to the frequency of a broadcast control channel in a radio system comprising a network part, a subscriber terminal and a radio connection as the transmission path between the network part and the subscriber terminal, the method comprising:

A) transmitting by the network part on the broadcast control channel a first signal group to the subscriber terminal at a given frequency, the first signal group indicating at which second frequency a next first signal group will be transmitted the next time, B) transmitting by the network part on the broadcast control channel a known number of other signals to the subscriber terminal using frequency hopping, wherein an offset of a first frequency hop has been agreed in advance, and offsets of other frequency hops are agreed in advance, and C) returning to step A to repeat steps A and B a predetermined number of times to form a frequency hopping sequence, wherein each transmission of the next first signal group to the subscriber terminal occurs at the second frequency identified in a preceding one of the first signal groups.

2. A method as claimed in claim 1, wherein the offset of the first frequency hop is also indicated in the first signal group.

3. A method as claimed in claim 1, wherein the first signal group indicates at which at least two other frequencies the first signal group will be transmitted at least the next and the following time.

4. A method as claimed in claim 1, wherein the downlink frequency hopping sequence is also used for common uplink channels.

5. A method as claimed in claim 1, wherein the first signal group comprises at least one Frequency Correction Channel signal and at least one Synchronization Channel signal.

6. A method as claimed in claim 1, wherein the other signals comprise the Broadcast Control Channel signals and/or Common Control Channel signals.

7. A method as claimed in claim 5, wherein the first signal group further comprises a first Synchronization Channel signal which indicates at which second frequency the first signal group will be transmitted the next time.

8. A method as claimed in claim 5, wherein the first signal group further comprises a second Synchronization Channel signal which indicates at which second frequency the first signal group will be transmitted the next time.

9. A method as claimed in claim 5, wherein the Frequency Correction Channel signal is always transmitted at the same given frequency.

10. A method as claimed in claim 7, wherein the Synchronization Channel signal comprises a Base Station Identity Code, a Time Division Multiple Access (TDMA) frame number, and the frequency of the first signal group to be transmitted the next time.

11. A method as claimed in claim 8, wherein the first signal group further comprises a first Synchronization Channel signal which comprises a Time Division Multiple Access (TDMA) frame number, and the second Synchronization Channel signal comprises a Base Station Identity Code and the frequency of the first signal group to be transmitted the next time.

12. A method as claimed in claim 2, wherein the first signal group comprises at least one Frequency Correction Channel signal and at least one Synchronization Channel signal.

13. A method as claimed in claim 3, wherein the first signal group comprises at least one Frequency Correction Channel signal and at least one Synchronization Channel signal.

14. A method as claimed in claim 4, wherein the first signal group comprises at least one Frequency Correction Channel signal and at least one Synchronization Channel signal.

15. A method as claimed in claim 2, wherein the other signals comprise the Broadcast Control Channel signals and/or Common Control Channel signals.

16. A method as claimed in claim 3, wherein the other signals comprise the Broadcast Control Channel signals and/or Common Control Channel signals.

17. A method as claimed in claim 4, wherein the other signals comprise the Broadcast Control Channel signals and/or Common Control Channel signals.

18. A method as claimed in claim 5, wherein the other signals comprise the Broadcast Control Channel signals and/or Common Control Channel signals.

19. A system for implementing downlink frequency hopping to the frequency of a broadcast control channel in a radio system comprising a network part, a subscriber terminal and a radio connection as the transmission path between the network part and the subscriber terminal, wherein:

the network part comprises a base station to transmit on the broadcast control channel a first signal group to the subscriber terminal at a given frequency, the first signal group stating at which second frequency a next first signal group will be transmitted the next time, and wherein the base station further transmits on the broadcast control channel other signals to the subscriber terminal using frequency hopping, an offset of a first frequency hop being agreed in advance, and offsets of other frequency hops being agreed in advance; and the subscriber terminal generates a frequency hopping sequence of the transmission frequencies of the first signal group, the offset of the first frequency hop and the offsets of the other frequency hops.

* * * * *